United States Patent [19]

Tinnes et al.

[11] Patent Number: 4,607,681
[45] Date of Patent: Aug. 26, 1986

[54] PROCESS AND APPARATUS FOR CONTROLLING A CONTINUOUS CASTING PLANT

[75] Inventors: Bernhard Tinnes, Zollikerberg, Switzerland; Heinz Kreuzberg, Bernau, Fed. Rep. of Germany

[73] Assignee: Metacon AG, Zurich, Switzerland

[21] Appl. No.: 593,945

[22] Filed: Mar. 27, 1984

[30] Foreign Application Priority Data

Mar. 29, 1983 [CH] Switzerland .................. 1724/83

[51] Int. Cl.⁴ .................. B22D 11/18; B22D 11/20
[52] U.S. Cl. .................. 164/453; 164/454; 164/449; 164/413
[58] Field of Search .................. 164/453, 454, 150, 154, 164/155, 413, 449

[56] References Cited

U.S. PATENT DOCUMENTS 3,349,834 10/1967 Wilson .................. 164/449
3,537,505 11/1970 Uster et al. .................. 164/454

FOREIGN PATENT DOCUMENTS 56-53856 5/1981 Japan .................. 164/453

Primary Examiner—Nicholas P. Godici
Attorney, Agent, or Firm—Cushman, Darby & Cushman

[57] ABSTRACT

For preventing break-out in a continuous casting plant in which the quantity of molten material being supplied to a mold is controlled to a predetermined level, changes in the quantity of molten material being supplied to the mold is constantly monitored. The time behavior of quantity increases of molten material being supplied to the mold is determined and a break-out signal is produced when the quantity of molten material increases at more than a predetermined rate. The break-out signal may be produced only when the rate of change of molten material in the mold and the rate of change of the speed of a casting leaving the mold are less than predetermined values.

22 Claims, 2 Drawing Figures

PROCESS AND APPARATUS FOR CONTROLLING A CONTINUOUS CASTING PLANT

BACKGROUND OF THE INVENTION

1. Field of the Invention

The present invention relates to the control of a continuous casting plant. More particularly the present invention relates to the automatic control of a continuous casting to maintain an adequate melting bath quantity in the mold.

2. Description of the Prior Art

Processes and apparatuses are already known, which serve to automatically initiate appropriate measures if faults occur during the operation of a continuous casting plant. In connection with the automation of continuous casting plants, control systems are known, which can also detect a breakout. Thus, these control systems have monitors associated with the ingot mold or the casting, and signals therefrom are evaluated by the control system as an indication of a break-out.

Another known control system has a plurality of level barriers or level measuring devices associated with the mold. Thus, a control system is known, in which when the bath level drops from a first level below the desired height to a second level within a predetermined time, it is assessed as a break-out. The time is determined as a function of the removal speed of the casting.

The known control systems, including those in which the detection of a break-out is based on the monitoring of the bath level in the ingot mold, have the disadvantage that the break-out must have a considerable magnitude for a corresponding unique signal to be produced from significant changes in the monitored parameters. Thus, the plant undergoes considerable damage as a result of the outflowing melting bath, before the supply of the latter to the mold is stopped.

SUMMARY OF THE INVENTION

The present invention is based on the fact that casting break-outs generally occur in the form of bleeding, i.e., as a small trickle, which escapes from a faulty point in the crust. When the supply of melting bath from the tundish is constant and the removal speed of the casting is constant, such bleeding would intially be indicated as a slow lowering of the bath level in the mold. If the bleeding persists and an ever-larger quantity of melting bath escapes from the casting, then in all probability a break-out exists.

On the basis of this finding, the problem of the present invention is to provide a process, which also detects small break-outs at an early stage. This problem is solved by a process and apparatus for monitoring for changes in the melting bath supply quantty, i.e., flow rate. When the change in the flow rate over time is greater than a predetermined value, a break-out signal is produced.

The solution according to the present invention takes account of the fact that the melting bath supply must undergo a change in the case of a break-out, which generally starts as bleeding, whereby the pattern of this change must distinguish it from changes caused by other events.

According to a preferred embodiment of the present invention, the removal speed of the casting, e.g., detected through permanent monitoring, is incorporated into the determination of the break-out state to the extent that an increase in this removal speed, and not a break-out, may be responsible for a rise in the quantity of melting bath supply to the mold.

It is also advantageous if, according to a further development of the present invention, the changes in the level of the bath in the mold are also used for determining the break-out state.

The present invention not only has the advantage compared with the prior art processes that it can detect small break-outs, but also permits their detection at an early time, i.e., not at a time when the supply of melting bath can no longer be increased or adequately increased for maintaining the bath level constant in the mold.

The solution provided by the present invention is based on the finding that, whereas admittedly the position of a slide valve through which the melting bath is provided to the mold does not represent an appropriate measure of the inflowing melting bath quantity, the changes to this valve position and in particular its time behavior are of very great interest in connection with the early detection of break-outs. The slide valve position changes in accordance with differences in the fill level of the tundish on the one hand and changes in the effective passage cross-section of the slide valve as a result of additions of deposits from the melting bath and the breaking off of such added deposits, or wear to the refractory material on the other. Changes to the slide valve position also occur due to fluctuations in the setting for maintaining the bath level constant and fluctuations in the removal speed. Despite the above influences, which bring about changes to the slide valve position and which in part cannot be directly detected and can act in the same or opposite directions, it is generally possible to sufficiently clearly interpret the cause of an increase in the melting bath quantity supplied by monitoring the time behavior and therefore detect break-outs at an early time.

The above findings incorporate the consideration that the dimension of those parts responsible for the melting bath supply, e.g., the slide valve, or its maximum passage cross-section is generally selected in such a way that the bath quantity in normal operation represents less than 50% of the maximum quantity.

For reasons of completeness, it is pointed out that the change to the supplied melting bath quantity within the scope of the present process can fundamentally be detected in some way other than through the monitoring and evaluation of the position changes of a slide valve on a tundish. However, it is surprising that the performance of the process by means of the apparatus according to the present invention through detecting changes to slide valve positions permits a more accurate and therefore more reliable representation of melting bath quantity changes and is therefore particularly well suited for detecting break-outs according to the process of the present invention.

BRIEF DESCRIPTION OF THE DRAWINGS

These and other objects and advantages of the present invention will become more apparent and more readily appreciated from the following detailed description of the presently preferred embodiment of the invention taken in conjunction with the accompanying drawings, of which.

DETAILED DESCRIPTION OF THE PRESENTLY PREFERRED EXEMPLARY EMBODIMENTS

Figure 1:
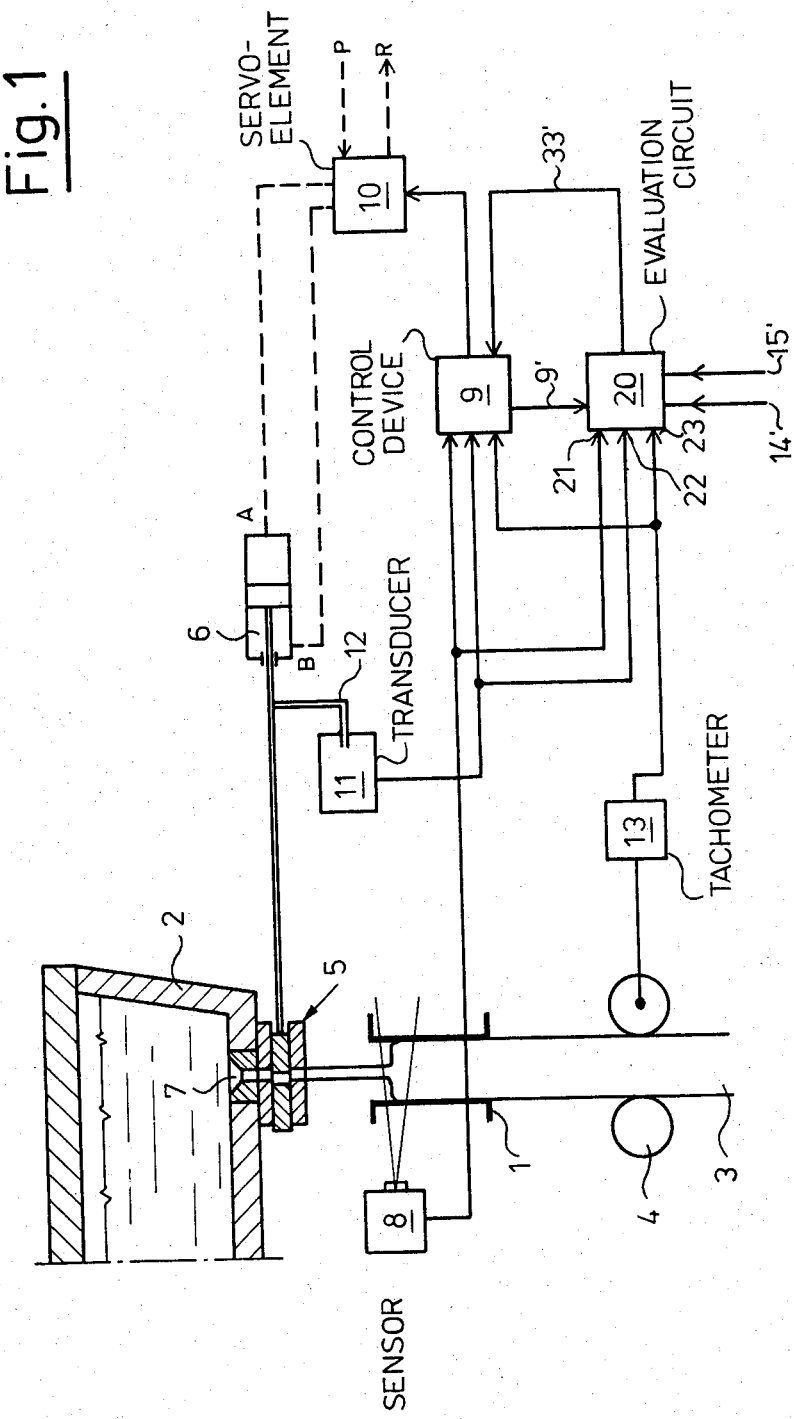
FIG. 1 is a diagrammatic view of a continuous casting plant equipped with the apparatus according to the present invention.

In FIG. 1, continuous casting mold 1 is supplied with a melting bath of, e.g., steel from a tundish 2. A casting 3 is removed from ingot mold 1 by removing or withdrawing rollers 4. Cooling and support means, not shown but well known, are associated with casting 3 below mold 1.

A governor slide valve 5, fitted to tundish 2 and operated by a servo drive 6, controls outlet 7 and determines the melting bath quantity flowing into ingot mold 1. A measuring device 8, e.g., responding to radioactive radiation, is associated with mold 1 and supplies a signal representing the actual melting bath fill level in mold 1. A control device 9 compares this signal with a desired fill level and if a considerable divergence exists, produces a control signal corresponding to the direction of the divergence for actuating a servo element 10 acting on servo drive 6. Thus, slide valve 5 is actuated for varying the inflow quantity until measuring device 8 again supplies an actual value signal, which corresponds to the desired value. The signals of a displacement transducer 11 associated with slide valve 5 or its servo drive 6 are available to control device 9 and as a result of corresponding analog signals, the position of the movable slide valve part is represented by means of the mechanical connection indicated at 12.

Finally, the signals of a tachometer 13 may optionally be supplied to control device 9. One of removal rollers 4 is coupled to tachometer 13 and drives the latter in accordance with the speed at which casting 3 is removed from mold 1. The signal from tachometer 13 may optionally be employed to adjust the desired level to which control device 9 causes valve 5 to fill mold 1. As the speed of the casting increases, without a corresponding increase in the fill level, the casting spends less time in the mold, increasing the chances of break-out. To compensate, the desired fill level may be increased with increasing casting speed.

According to the invention, the present invention includes evaluation circuit 20 for producing a break-out signal. As will be described in greater detail in connection with FIG. 2, evaluation circuit 20 processes signals supplied thereto from several sources and from them produces a break-out signal when certain conditions have been fulfilled. Besides input 21, which is also connected to measuring device 8, signals from displacement transducer 11 are supplied to circuit 20 by a further input 22. Finally, an input 23 is connected to tachometer 13.

Evaluation circuit 20 (FIG. 2) is formed from per se known elements. For inputs 21, 22 and 23, it respectively comprises filters 24a, 24b and 24c, e.g., a low-pass filter and connected in series therewith time-based differentiating elements 25a, 25b and 25c, as well as threshold switches 26a, 26b and 26c. Threshold switches 26a, 26b and 26c are all connected to inputs of a logic AND gate 27. Digital signals 21' and 23' produced by threshold switches 26a and 26c, respectively, are supplied, via logic inversion elements 28a and 28c, whereas signal 21' is directly provided to logic AND gate 27. The output of AND gate 27 is connected to a further logic AND gate 29, whose further input 29b is connected to a bistable multivibrator 30. Multivibrator 30 is set by digital signal 9', indicating the start of casting, from control device 9 across a delay line 31 and reset by a digital signal 14', which is released by members (not shown) at the end of the casting process. The output of AND gate 29 is connected across a further delay line 32 with a further bistable multivibrator 33, to which can also be supplied a digital resetting signal 15'. As can be gathered from FIG. 1, signal 33' is supplied to control device 9, which in turn acts via servo elements 10 on servo drive 6.

At the start of the casting process, control device 9 supplies a digital signal 9' via delay line 31 and multivibrator 30 to input 29b of AND gate 29, so that signal state "1" prevails at this input.

During casting operation, the analog signals of pickups 8, 11 and 13 are supplied across inputs 21, 22 and 23 to low-pass filters 24a, 24b and 24c, e.g., single-stage filters, with 20 dB/decade and a time constant of 700 ms. The first derivatives are formed in differentiating elements 25a, 25b and 25c from the signals freed of high frequency components and are supplied to threshold value switches 26a, 26b and 26c. If the pickups detect no changes or if these changes are taking place slowly, threshold switches 26a–26c do not respond. Thus, at input 27b of AND gate 27 signal state "0" prevails. Signals 21' and 23' also have signal states "0", so that inverters 28a and 28c produce signal states "1" at inputs 27a and 27c. Thus, signal 27' at input 29a of AND gate 29 represents signal state "0". Correspondingly, signals 29' and 33' in the normal operation of the continuous casting plant represent logic "0". If a signal appears at input 22 produced by displacement transducer 11, whose first derivative on the basis of magnitude and sign reaches or exceeds the value set on threshold switch 26b, then signal state "1" occurs at input 27b of AND gate 27. This signal state represents a relatively rapid increase in the quantity, i.e., flow rate of molten metal supplied, brought about by a relatively speedy opening of slide valve 5. If this change to the signal state at AND gate 27 is not accompanied by a change to the signal state at inputs 27a or 27c, this means that neither the level, nor the removal speed undergoes a significant change. Therefore, the signal of transducer 11 is not a normal control movement of slide valve 5. Since the changing of the signal state to logic "1" at input 27b causes the same signal state to occur at all inputs of AND gate 27, a logic "1" is produced on line 27'. Thus, signal state "1" also prevails at inputs 29a and 29b and output signal 29' becomes logic "1". If the signal is maintained over the time lag of delay line 32, then signal 33' also becomes logic "1" and via control device 9, servo element 10 receives the instruction to immediately close slide valve 5 via servo drive 6.

Thus, evaluation circuit 20 has indicated a break-out on the casting, before there has been any significant drop in the level in the ingot mold. It must be borne in mind in this connection that, due to a signal from measuring device 8, control device 9 has already caused slide valve 5 to bring about an increase in the supply, by increasing the flow cross-section, in order to compensate for minor differences between the desired level value and its actual value. The signal of measuring device 8, which has also appeared at differentiating element 25a connected to input 21, has not made threshold switch 26a respond. Quite apart from the fact that the signal produced by differentiating element 25a does not have an adequate absolute value to make threshold switch 26a respond, said signal also does not have the correct sign.

If either of threshold switches 26a or 26c changes state because the removal speed of casting 5 increases, or because the level in mold 1 rises, a change also occurs in the signal state at input 27c or 27a of AND gate 27 from logic "1" to logic "0". Therefore, any change to the signal state at input 27b of gate 27, caused by the operation of control device 9 which has triggered an opening movement of governor slide valve 5, is not evaluated as a break-out signal by AND gate 27.

Figure 2:
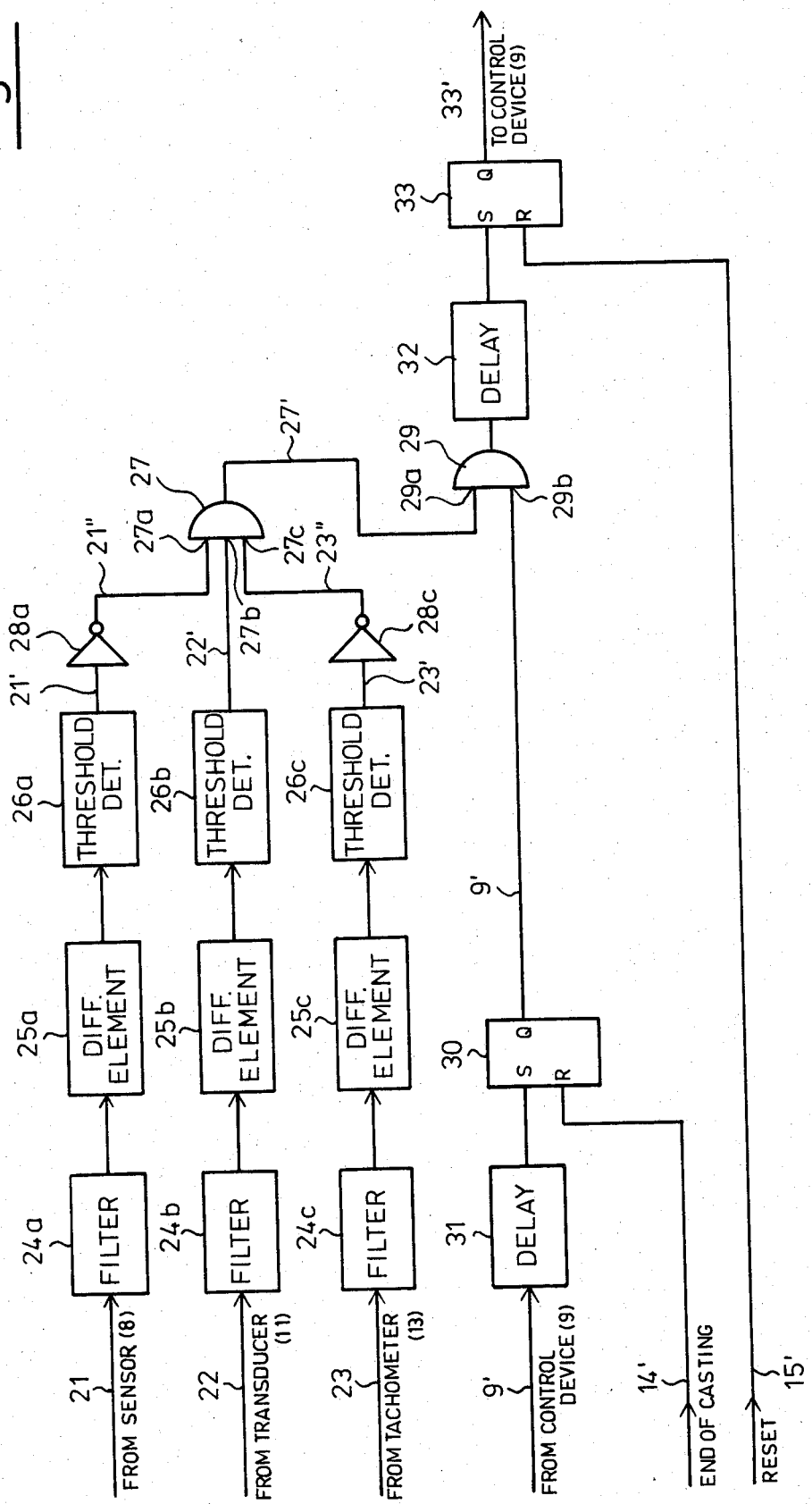
FIG. 2 is a basic diagram of an evaluation circuit belonging to this apparatus.

In the aforementioned construction of evaluation circuit 20 shown in FIG. 2, the signals of pickups 8 and 13 may block AND gate 27 from indicating a break-out when level changes and removal speed changes occur. However, a construction of this evaluation circuit is also conceivable, which takes account of all dynamic processes in accordance with their influence on the slide valve position. This is either possible in such a way that the signals of differentiating elements 25a and 25c, connected to inputs 21 and 23, are supplied not only to their own threshold switches 26a and 26c, but also to threshold switch 26b connected to input 22 to continuously change its threshold value in accordance with the signals obtained. However, it is also possible to supply the signals of all differentiating elements 25a–25c to a common integrating operational amplifier, which in turn causes a single threshold switch to operate, when the analog signal obtained represents a break-out.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A process for detecting break-out in a continuous casting plant having a mold wherein the quantity of molten material being supplied to said mold is controlled to a predetermined level, comprising the steps of:
    monitoring the change in the flow rate of molten material being supplied, said monitoring being carried out prior to the molten metal reaching the mold;
    determining the time behavior of flow rate increases detected in said monitoring step; and
    producing a break-out signal when the flow rate of said molten material increases at more than a predetermined rate.

2. A process as in claim 1 wherein:
    said method further comprises the step of monitoring the removal speed of a casting; and
    said producing step produces said break-out signal only when the removal speed has a predetermined relationship with the rate of increase of said molten metal flow rate.

3. A process as in claim 2 wherein said monitoring step includes the step of monitoring for changes in the position of a governor slide through which said molten material passes to an ingot mold.

4. Apparatus for detecting break-out in a continuous casting plant including a source of molten material, a governor slide valve for controlling the flow of molten material from said source, a mold for receiving molten material from said valve and control means for controlling said valve to maintain the level of molten material in said mold constant, said apparatus comprising:
    means for producing a position signal related to the position of said valve;
    means for time-based differentiating said position signal; and
    evaluation means for producing a break-out signal when said differentiated position signal exceeds a predetermined value.

5. Apparatus according to claim 4 wherein:
    said apparatus further comprises means for producing a level signal related to the level of molten material in said mold and means for time-based differentiating said level signal; and
    said evaluation means includes means for generating said break-out signal when said differentiated position signal and said differentiated level signal have a predetermined relationship.

6. Apparatus according to claim 4 wherein:
    said apparatus further comprises tachometer means for producing a speed signal related to the movement of a casting and means for time-based differentiating said speed signal; and
    said evaluation means includes means for generating a break-out signal when said differentiated position signal and said differentiated speed signal have a predetermined relationship.

7. Apparatus according to claim 5 wherein:
    said apparatus further comprises tachometer means for producing a speed signal related to the movement of a casting and means for time-based differentiating said speed signal; and
    said generating means produces said break-out signal when said differentiated position signal, said differentiated level signal and said differentiated speed signal have a predetermined relationship.

8. Apparatus according to claim 4 wherein said evaluation means includes threshold detecting means for determining when said differentiated position signal exceeds a predetermined threshold.

9. Apparatus according to claim 5 wherein said evaluation means further comprises:
    a first threshold detecting means for determining when said differentiated position signal exceeds a first predetermined threshold; and
    a second threshold detecting means for determining when said differentiated level signal exceeds a second predetermined threshold.

10. Apparatus according to claim 7 wherein said evaluation means further comprises:
    a first threshold detecting means for determining when said differentiated position signal exceeds a first predetermined threshold;
    a second threshold detecting means for determining when said differentiated level signal exceeds a second predetermined threshold; and
    a third threshold detecting means for determining when said differentiated speed signal exceeds a third predetermined threshold.

11. Apparatus according to claim 5 wherein said generating means includes a logic element having a first input coupled to said differentiated position signal and a second input coupled to said differentiated level signal.

12. Apparatus according to claim 6 wherein said generating means includes a logic element having a first input coupled to said differentiated position signal and a second input coupled to said differentiated speed signal.

13. Apparatus according to claim 10 wherein said generating means includes a logic element having a first input coupled to said differentiated position signal, a second input coupled to said differentiated level signal and a third input coupled to said differentiated speed signal.

14. Apparatus according to claim 13 wherein:
said logic element is an AND gate; and
said apparatus further comprises a first means, coupled to an input of said AND gate for inverting said differentiated level signal and second means, coupled to another input of said AND gate, for inverting said speed signal.

15. Apparatus for continuously molding molten material comprising:
a source of molten material;
a governor slide valve for controlling the flow of molten material from said source;
a mold for receiving said molten material from said valve;
means for producing a position signal related to the position of said valve;
means for producing a level signal related to the level of molten material in said mold;
means for producing a speed signal related to the speed a casting leaves said mold;
means, responsive to said level signal and said speed signal, for controlling said valve to maintain the level of molten material in said mold constant;
means for time-based differentiating said position signal to produce a differentiated position signal;
means for time-based differentiating said level signal to produce a differentiated level signal;
means for time-based differentiating said speed signal to produce a differentiated speed signal; and
evaluation means, responsive to said differentiated position signal, said differentiated level signal and said differentiated speed signal, for producing a break-out signal when said differentiated position signal, said differentiated level signal and said differentiated speed signal have a predetermined relationship.

16. A process for detecting break-out in a continuous casting plant wherein the quantity of molten material being supplied is controlled to a predetermined level, comprising the steps of:
monitoring for changes in the position of a governor slide through which said molten material passes to an ingot mold;
determining the time behavior of changes in the opening past said governor slide detected in said monitoring step; and
producing a break-out signal when the opening through said governor slide increases at more than a predetermined rate.

17. A process for detecting break-out in a continuous casting plant wherein the quantity of molten material being supplied is controlled to a predetermined level, comprising the steps of:
monitoring for changes in the position of a governor slide through which said molten material passes to an ingot mold;
determining the time behavior of changes in the opening past said governor slide detected in said monitoring step;
monitoring the removal speed of a casting;
monitoring the level of molten material in an ingot mold; and
producing a break-out signal when the removal speed and ingot mold level have a predetermined relationship with a rate at which the opening through said governor slide increases.

18. A process for detecting break-out in a continuous casting plant wherein the quantity of molten metal being supplied is controlled to a predetermined level, comprising the steps of:
monitoring the level of molten metal in an ingot mold;
monitoring the removal speed of a casting from said ingot mold;
monitoring the changes in the flow rate of molten material being supplied to said mold;
determining the time behavior of flow rate increases detected in said flow rate monitoring step; and
producing a break-out signal when the removal speed and ingot mold level have a predetermined relationship with the rate of increase of said molten metal flow rate.

19. A process for detecting break-out in a continuous casting plant wherein the quantity of molten material being supplied is controlled to a predetermined level, comprising the steps of:
monitoring the level of molten material in an ingot mold;
monitoring the changes in the flow rate of molten metal being supplied to said mold;
determining the time behavior of flow rate increases detected in said flow rate monitoring step; and
producing a break-out signal only when the ingot mold level has a predetermined relationship with the rate of increase of said molten metal flow rate.

20. A process as in claim 16 wherein:
said method further comprises the step of monitoring the level of molten material in an ingot mold; and
said producing step produces said break-out signal only when the ingot mold level has a predetermined relationship with the rate of increase of said molten metal flow rate.

21. A process as in claim 19 wherein said monitoring step includes the step of monitoring for changes in the position of a governor slide through which said molten material passes to an ingot mold.

22. A process as in claim 18 wherein said monitoring step includes the step of monitoring for changes in the position of a governor slide through which said molten material passes to an ingot mold.

* * * * *